United States Patent
Krull

(12) 
(10) Patent No.: US 10,101,579 B2
(45) Date of Patent: Oct. 16, 2018

(54) LENS COVER FOR AN OPTICAL INSTRUMENT

(71) Applicant: Donald R. Krull, Sparta, IL (US)

(72) Inventor: Donald R. Krull, Sparta, IL (US)

(*) Notice: Subject to any disclaimer, the term of this patent is extended or adjusted under 35 U.S.C. 154(b) by 159 days.

(21) Appl. No.: 14/176,043

(22) Filed: Feb. 7, 2014

(65) Prior Publication Data

US 2015/0226959 A1    Aug. 13, 2015

(51) Int. Cl.
*G02B 27/00* (2006.01)
*G02B 23/16* (2006.01)
*G02B 23/18* (2006.01)

(52) U.S. Cl.
CPC ......... *G02B 27/0006* (2013.01); *G02B 23/16* (2013.01); *G02B 23/18* (2013.01)

(58) Field of Classification Search
CPC ......... F41G 1/383; G02B 23/16; G02B 23/18; G02B 23/20; G03B 11/04; G03B 11/041; G03B 11/045; G03B 11/046; G03B 11/048

USPC ........................... 359/510–512; 42/129, 143
See application file for complete search history.

(56) References Cited

U.S. PATENT DOCUMENTS

| 2006/0191184 | A1* | 8/2006 | Wisecup et al. ................. 42/96 |
| 2006/0200170 | A1* | 9/2006 | Aranyi ............. A61B 17/00234 606/113 |
| 2010/0037506 | A1* | 2/2010 | Carley ............................ 42/129 |
| 2013/0129338 | A1* | 5/2013 | Dowell ......................... 396/448 |

* cited by examiner

*Primary Examiner* — Marin Pichler
(74) *Attorney, Agent, or Firm* — Harness, Dickey & Pierce, P.L.C.

(57) ABSTRACT

A lens cover for an optical instrument has a first flexible cover panel having a sleeve thereon forming a substantially closed loop, and a second flexible cover panel having a sleeve thereon forming a substantially closed loop. A drawstring has its first end secured to the first flexible cover panel, with the portion of the drawstring adjacent the first end extending through the sleeve on the first flexible cover; and its second end secured to the second flexible cover panel, with the portion of the drawstring adjacent the second end extending through the sleeve on the second flexible cover.

14 Claims, 7 Drawing Sheets

LENS COVER FOR AN OPTICAL INSTRUMENT

BACKGROUND

This invention relates to a lens cover for an optical instrument.

Optical devices such as camera lenses, binoculars, telescopes, spotting scopes, range finders, and rifle scopes have expensive lenses that should be protected from dirt and scratches when not in use. These devices typically comprise a barrel of some sort, having first and second ends, with lenses at each end. Various types of rigid plastic lens caps are available for these devices, but these caps are easily lost once removed, and those with tethers tend to rattle or clink, which is annoying the user and while nature watching or hunting can scare away animals.

SUMMARY

Embodiments of this invention provide an improved lens cover for an optical instrument. In a preferred embodiment, this lens cover can comprise a first flexible cover panel having a sleeve therein forming a substantially closed loop, and a second flexible cover panel having a sleeve thereon forming a substantially closed loop. A drawstring having first and second ends, the first end secured to the first flexible cover panel, with the portion of the drawstring adjacent the first end extending through the sleeve on the first flexible cover; and the second end secured to the second flexible cover panel, with the portion of the drawstring adjacent the second end extending through the sleeve on the second flexible cover.

The first and second cover panels are preferably generally circular, and preferably comprise a first ply of a microfiber material, and a second ply of a water resistant material. The sleeve can be formed between the first and second plies, preferably adjacent the circumferential edges of the first and second cover panels.

The drawstring is preferably a resilient cord. When pulled, the draw string pulls the cover panels into a concave configuration to allow each cover to be secured over the lens of an optical instrument. In one preferred method of use, the lens cover can be releasably secured to the optical instrument by winding the cord around the barrel of the optical instrument, allowing the flexible cover panels to fit over one of the lenses at each end of the barrel. The resilience of the drawstring can apply a tension to keep the flexible cover panels in their concave configuration and help hold the flexible cover panels over their respective lenses.

Another preferred embodiment of the invention comprises the combination of an optical device having a barrel and first and second ends, and a lens cover for an optical instrument. The lens cover preferably comprises a first flexible cover panel having a sleeve forming a substantially closed loop thereon; and a second flexible cover panel having a sleeve forming a substantially closed loop thereon. A drawstring, having first and second ends, has the first end secured to the first flexible cover panel, with the portion of the drawstring adjacent the first end extending through the sleeve on the first flexible cover; and has the second end secured to the second flexible cover panel, with the portion of the drawstring adjacent the second end extending through the sleeve on the second flexible cover. The portion of the drawstring intermediate the first and second ends is wrapped around the barrel, and the drawstring pulling the first flexible cover panel in a concave configuration to fit over the first end of the optical device, and pulling the second flexible cover panel into a concave configuration to fit over the second end of the optical device.

BRIEF DESCRIPTION OF THE DRAWINGS

The drawings described herein are for illustrative purposes only of selected embodiments and not all possible implementations, and are not intended to limit the scope of the present disclosure.

FIG. 3 is a side elevation view of the lens cover of the preferred embodiment, shown as it would be installed on an optical device;

Corresponding reference numerals indicate corresponding parts throughout the several views of the drawings.

DETAILED DESCRIPTION

Figure 1:
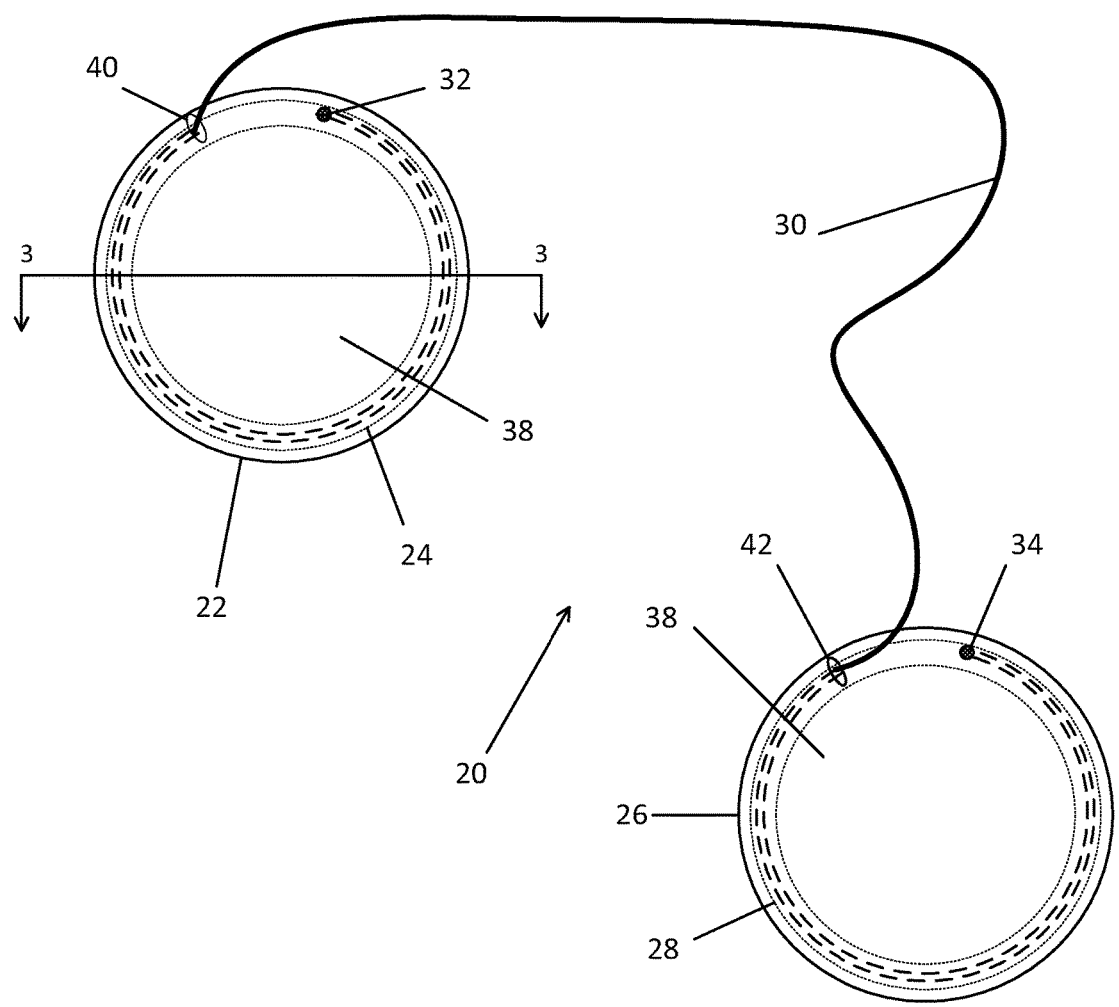
FIG. 1 is a top plan view of a preferred embodiment of a lens cover in accordance with the principles of this invention.
Figure 2:
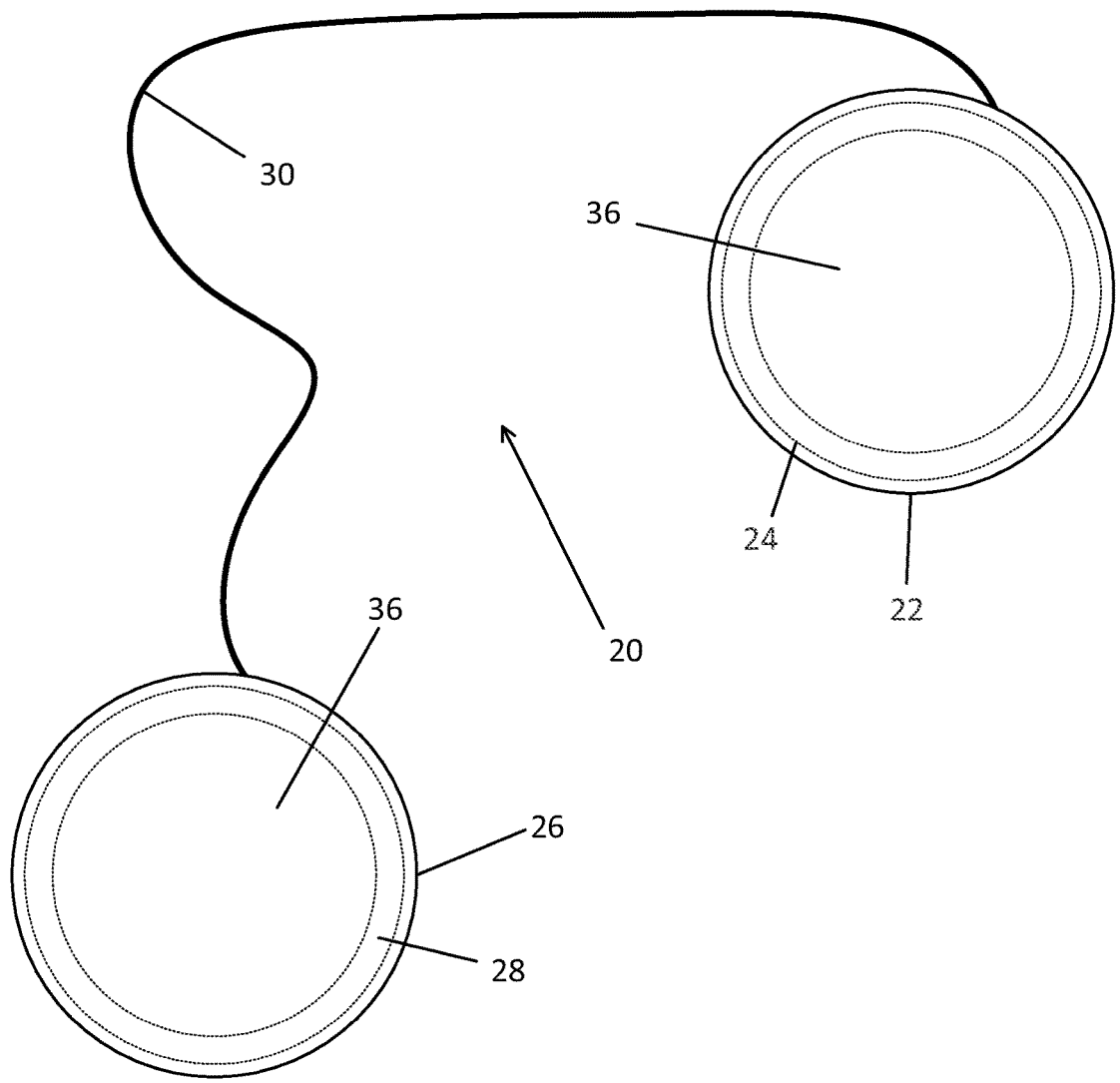
FIG. 2 is a bottom plan view of the lens cover of the preferred embodiment.
Figure 3:
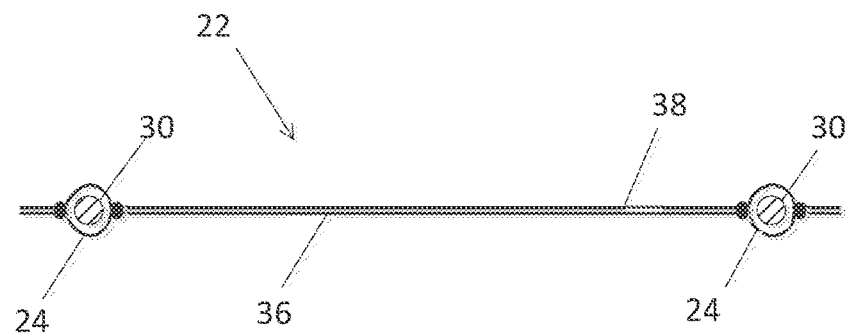
FIG. 3 is a transverse cross-sectional view through the first flexible cover panel, taken along the plane of line 3-3 in FIG. 1 cover

A preferred embodiment of a lens cover for an optical instrument is indicated generally as 20 in the figures. The lens cover 20 comprises a first flexible cover panel 22 having a sleeve 24 thereon forming a substantially closed loop. The lens cover 20 further comprises a second flexible cover panel 26 having a sleeve 28 forming a substantially closed loop.

The lens cover 20 further comprises a drawstring 30 having first and second ends 32 and 34. The first end 32 of the drawstring 30 is secured to the first flexible cover panel 22, with the portion of the drawstring adjacent the first end extending through the sleeve 24 on the first flexible cover panel; and the second end 34 secured to the second flexible cover panel 26, with the portion of the drawstring adjacent the second end extending through the sleeve 28 on the second flexible cover panel. Pulling the drawstring 30 pulls each of the flexible cover panels 22 and 26 into a concave configuration that can be secured over then end of an optical instrument to protected the lens.

Each of the first and second cover panels 22 and 26 are preferably circular, although they could be some other shape. The first and second cover panels 22 and 26 preferably have a diameter of between about four inches and about six inches, and most preferably about five inches. The first and second cover panels 22 and 26 are preferably formed of two plies, an inner ply 36 made of a microfiber material, and an outer ply 38 made of a water-resistant material.

The inner ply 36 is soft and protects the lens over which it is mounted. It can also be used to clean and remove fog/moisture from the lens during use.

The outer ply 38 is made of a water resistant material, which can be a water repellant material, such as a treated cloth material, which has the advantage of being very flexible and not prone to rustling or crackling, or a water proof material, which while having superior water resistance, depending upon the material, the thickness, and the temperature, can sometime rustle, crackle, or otherwise make noise when moved.

The sleeves 24 and 28 are preferably formed between the plies 36 and 38 of their respective flexible cover panels 20 and 26. The plies can be joined by stitching, adhesive, a thermomelt material, or otherwise about the periphery of the plies and spaced inwardly from the periphery to form the sleeves 24 and 28, forming a generally circular sleeve.

The drawstring 30 is preferably made from a resilient cord, and is preferably between about 36 and about 48 inches long. This makes the length of the cord between the first and second flexible cover panels about six and 18 inches. As shown in the figures, the portion of the drawstring 30 adjacent the first end 32 passes through an opening 40 in the outer ply 38 of the first flexible cover panel 22 at one end of the sleeve 24, and the first end is attached to the first flexible cover panel 22 at the other end of the sleeve 24. Similarly, the portion of the drawstring 30 adjacent the second end 34 passes through an opening 42 in the outer ply 38 of the second cover panel 26 at one end of the sleeve 28, and the second end is attached to the second flexible cover panel 26 at the other end of the sleeve 28.

According to another preferred embodiment, the lens cover 20 can be part of a combination with an optical device having a barrel and first and second ends, such as a camera lens, telescope, binoculars, spotting scope, rifle scope, etc. The portion of the drawstring 30 intermediate the first and second ends 32 and 34 is wrapped around the barrel, with the drawstring pulling the first flexible cover panel in a concave configuration to fit over the first end of the optical device, and pulling the second flexible cover panel into a concave configuration to fit over the second end of the optical device. As described above, the drawstring 30 is preferably resilient, and this resilience creates a tension on the first and second flexible covers holding them in place.

Figure 4:
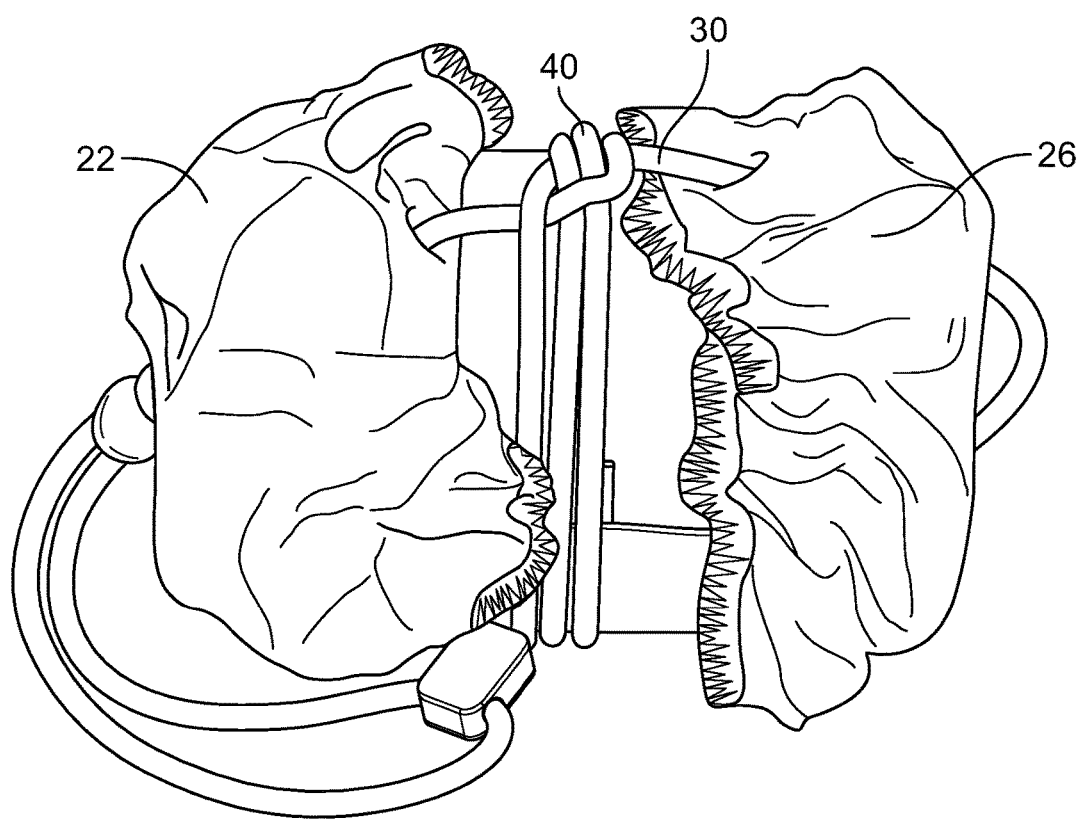
FIG. 4 is a side elevation view of the lens cover of the preferred embodiment, shown as it would be installed on an optical device.
Figure 5:
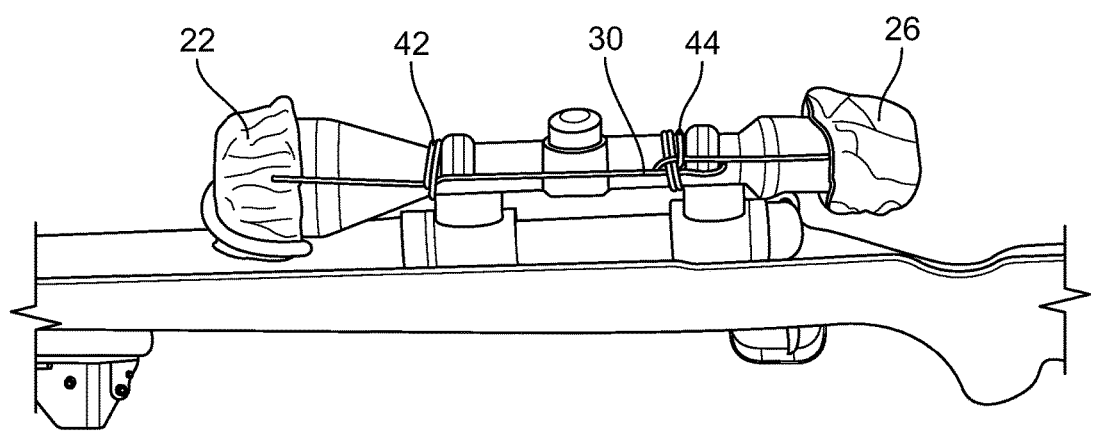
FIG. 5 is a perspective view of the lens cover of the preferred embodiment shown as it would be mounted on a rifle scope.
Figure 6:
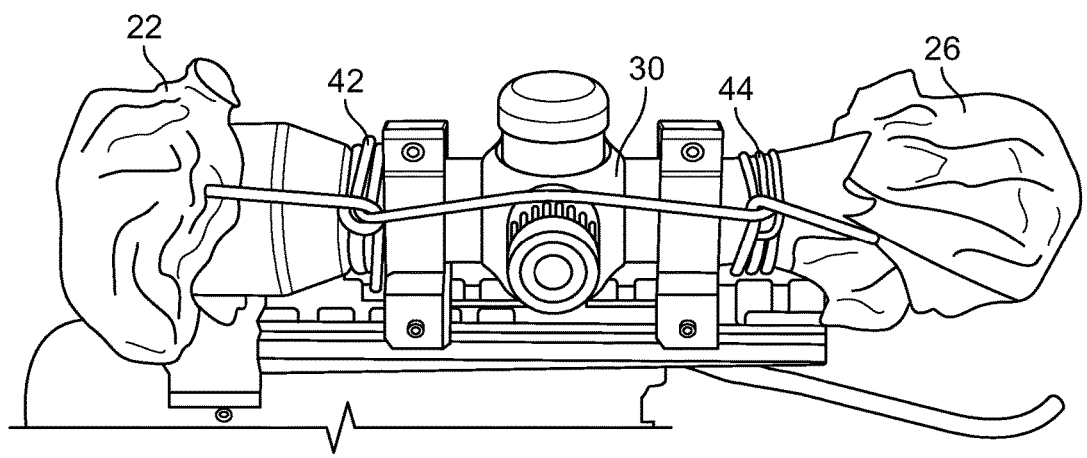
FIG. 6 is an enlarged perspective view of the lens cover the preferred embodiment shown as it would be mounted on a rifle scope.

As shown in FIG. 4 the drawstring 30 can be looped around the barrel of the optical device in a series of loops 40, with the drawstring passing through the loops at each end in such a way as to secure the lens cover to the device. Thus, when the covers are removed they remain tethered to the device so that they cannot be lost.

Figure 7:
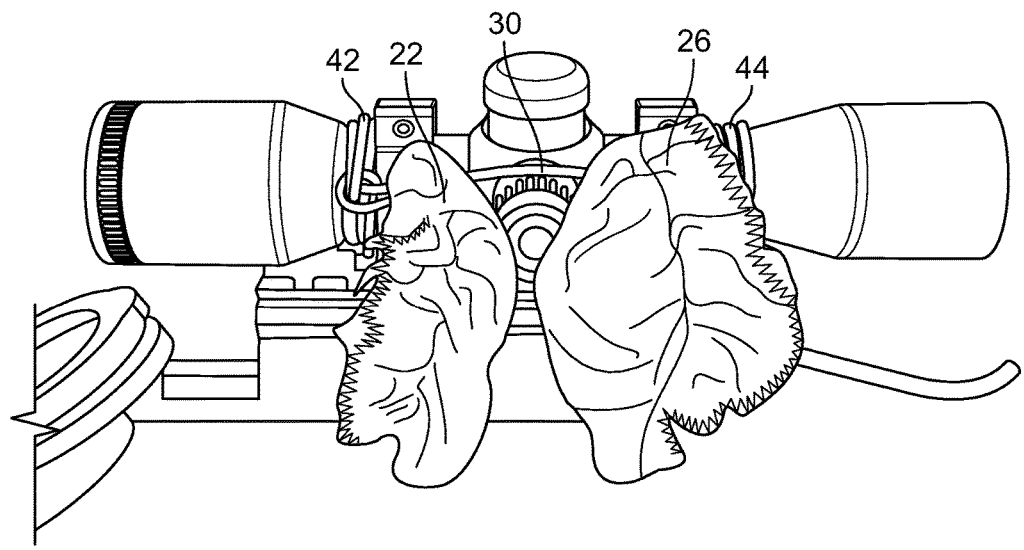
FIG. 7 is a perspective view of the lens cover the preferred embodiment shown as it would be mounted on a rifle scope, with the cover panels removed from the lens.
Figure 8:
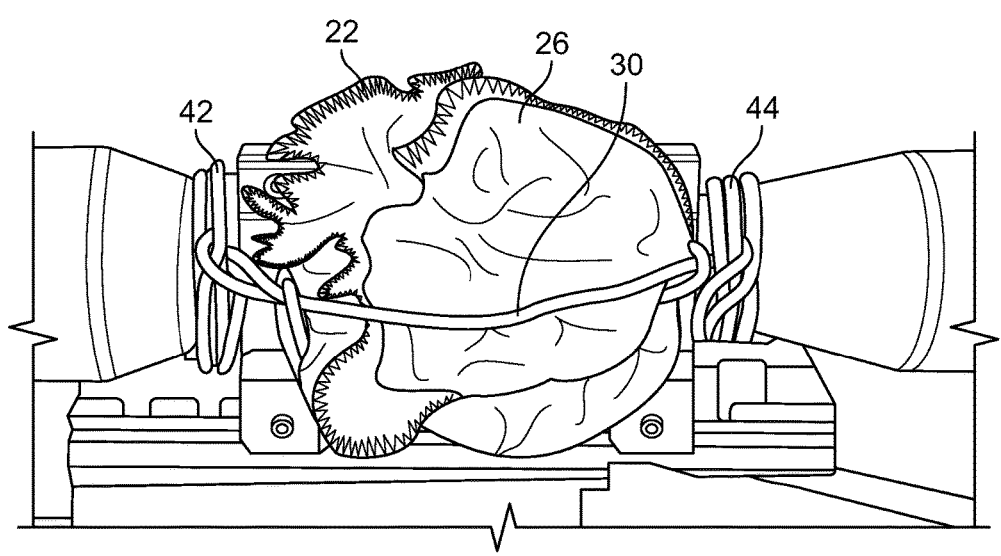
FIG. 8 is a perspective view of the lens cover the preferred embodiment shown as it would be mounted on a rifle scope, with the cover panels removed from the lens and stowed.

As shown in FIGS. 5-8, the lens cover 20 can also be mounted on a longer device such as a rifle scope. The drawstring is wrapped around the scope to form two spaced series of loops 42 and 44. This configuration allows each of the lens covers 22 and 26 to be independently tensioned by sliding the its respective series of loops 42 or 44 toward or away the lens cover, Increasing the tension by sliding the series of loops away from the lens cover tightens the cover around the end of the scope (or other optical instrument) and simultaneously more tightly holds the cover over the end. Similarly, decreasing the tension by sliding the series of loops toward the lens cover loosens the cover around the end of the scope and simultaneously loosens the attachment of the cover over the end. As shown in FIG. 7, the covers can be removed from the front and back ends of the scope, and as shown in FIG. 8, the loose covers can then be tucked under the cord 30 to secure them.

Figure 9:
FIG. 9 is a perspective view of the lens cover of the preferred embodiment shown as it would be mounted on binoculars.
Figure 10:
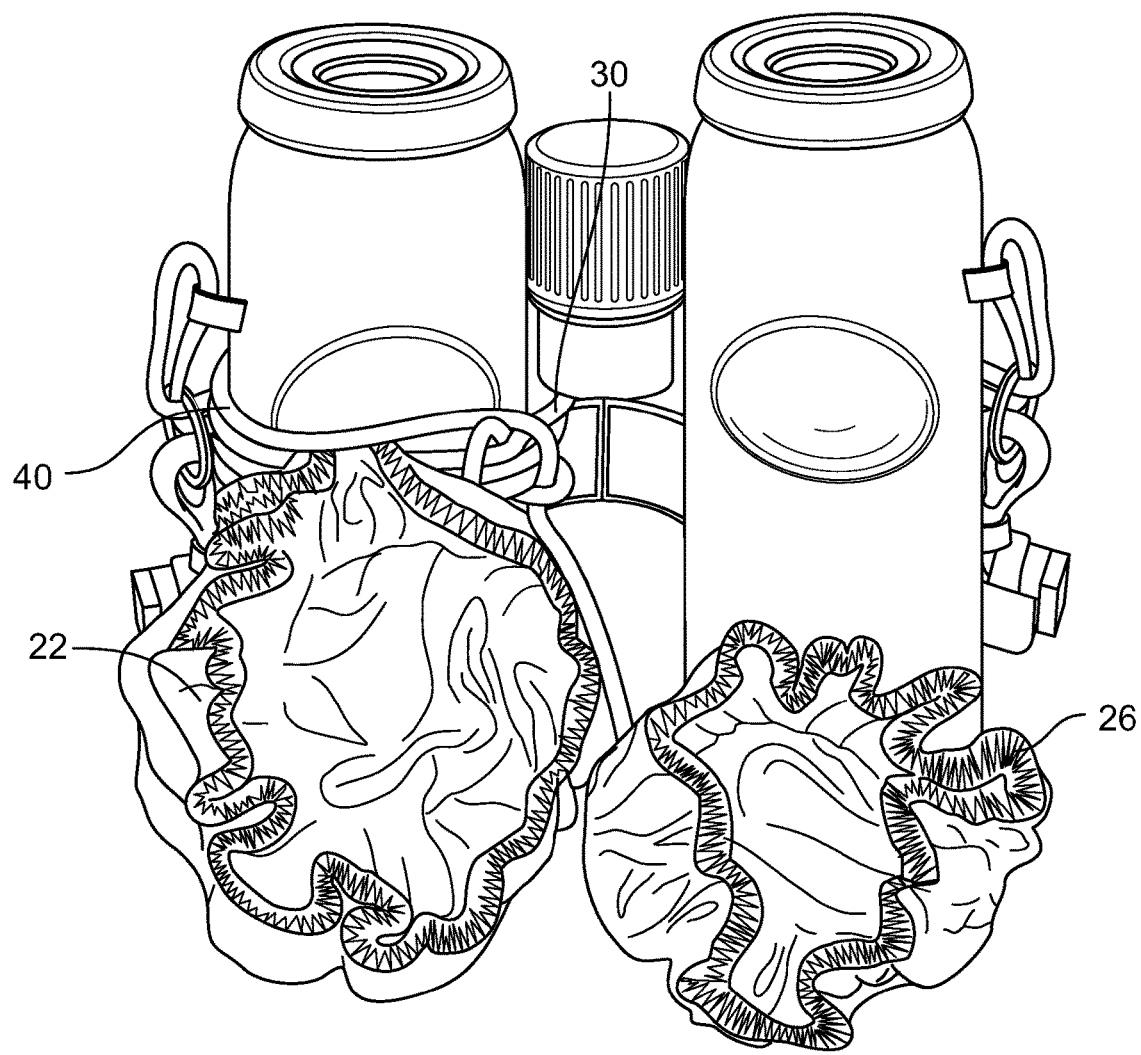
FIG. 10 is a perspective view of the lens cover of the preferred embodiment shown as it would be mounted on binoculars.

The lens covers can also be installed on a pair of binoculars. If one cover is used, it can be used to protect the ends of both barrels of the binoculars. Alternatively if two covers are used, one can be used to protect both ends of the same barrel, or one can be used to protect one end of both barrels and one can be used to protect the other end of both barrels. FIG. 9 shows a single lens cover as it would be installed over the eye pieces of both barrels of a pair of binoculars, and FIG. 10 shows the single lens cover removed from the eyepieces although still secured to one of the barrels via loops 40. The cover panels can be allowed to flop freely (the cloth construction minimizing the noise). However the cover panels can be tucked under one of the loops of the series of loops 40, if desired.

The to two separate, spaced loops. The tension applied to each of the first and second flexible cover panels can be separate adjusted by sliding the appropriate loops along the barrel toward or away from the flexible cover panel.

What is claimed is:

1. A lens cover for an optical instrument, the lens cover comprising:
   a first flexible cover panel having a sleeve forming a substantially closed loop thereon;
   a second flexible cover panel having a sleeve forming a substantially closed loop thereon;
   a drawstring having first and second ends, the first end of the drawstring secured to the first flexible cover panel, with the portion of the drawstring adjacent the first end extending through the sleeve on the first flexible cover so that pulling the drawstring pulls the first flexible cover panel into a concave configuration that can be secured over an end of an optical instrument; and the second end of the drawstring secured to the second flexible cover panel, with the portion of the drawstring adjacent the second end extending through the sleeve on the second flexible cover so that pulling the drawstring pulls the second flexible cover panel into a concave configuration that can be secured over an end of an optical instrument.

2. The lens cover according to claim 1 wherein the first and second cover panels comprises a first ply of microfiber material, and a second ply of a water resistant material.

3. The lens cover according to claim 1 wherein the first and second cover panels comprises a first ply of microfiber material, and a second ply of a water resistant material, and wherein the sleeve is formed between the first and second plies.

4. The lens cover according to claim 1 wherein the first and second cover panels are generally circular.

5. The lens cover according to claim 4 wherein the sleeves on each of the first and second cover panels are generally circular.

6. The lens cover according to claim 5 wherein the sleeves on each of the first and second cover panels are adjacent the circumferential edges of the first and second cover panels.

7. The lens cover according to claim 1 wherein the drawstring is resilient.

8. In combination with an optical device having a barrel and first and second ends, a lens cover for an optical instrument, the lens cover comprising a first flexible cover panel having a sleeve forming a substantially closed loop thereon; a second flexible cover panel having a sleeve forming a substantially closed loop thereon; a drawstring having first and second ends, the first end of the drawstring secured to the first flexible cover panel, with the portion of the drawstring adjacent the first end extending through the sleeve on the first flexible cover so that pulling the drawstring pulls the first flexible cover panel into a concave configuration that can be secured over a first end of the optical device; and the second end of the drawstring secured to the second flexible cover panel, with the portion of the drawstring adjacent the second end extending through the sleeve on the second flexible cover so that pulling the drawstring pulls the first flexible cover panel into a concave configuration that can be secured over the second end of an optical device; the portion of the drawstring intermediate the first and second ends being wrapped around the barrel, and the drawstring pulling the first flexible cover panel in a concave configuration to fit over the first end of the optical device, and pulling the second flexible cover panel into a concave configuration to fit over the second end of the optical device.

9. The combination according to claim 8 wherein the first and second cover panels comprises a first ply of microfiber material, and a second ply of a water resistant material.

10. The combination according to claim 8 wherein the first and second cover panels comprises a first ply of microfiber material, and a second ply of a water resistant material, and wherein the sleeve is formed between the first and second plies.

11. The combination according to claim 8 wherein the first and second cover panels are generally circular.

12. The combination according to claim 8 wherein the sleeves on each of the first and second cover panels are generally circular.

13. The combination according to claim 8 wherein the sleeves on each of the first and second cover panels are adjacent the circumferential edges of the first and second cover panels.

14. The combination according to claim 8 wherein the drawstring is resilient.

\* \* \* \* \*